(12) United States Patent  
Bulman et al.

(10) Patent No.: US 6,915,041 B2  
(45) Date of Patent: Jul. 5, 2005

(54) PHOTONIC DEVICE PACKAGE

(75) Inventors: Jonathan Mark Bulman, Balgowlah Heights (AU); Hugh Gregory Inglis, Gymea Bay (AU); David Charles Psaila, Kingsford (AU); Simon Blanchette Poole, Roseville (AU)

(73) Assignee: JDS Uniphase Corporation, San Jose, CA (US)

( * ) Notice: Subject to any disclaimer, the term of this patent is extended or adjusted under 35 U.S.C. 154(b) by 27 days.

(21) Appl. No.: 10/181,729

(22) PCT Filed: Jan. 19, 2001

(86) PCT No.: PCT/AU01/00055

§ 371 (c)(1),
(2), (4) Date: Jan. 7, 2003

(87) PCT Pub. No.: WO01/53862

PCT Pub. Date: Jul. 26, 2001

(65) Prior Publication Data

US 2003/0108288 A1 Jun. 12, 2003

(30) Foreign Application Priority Data

Jan. 20, 2000 (AU) .............................................. PQ5183

(51) Int. Cl.$^7$ ................................................. G02B 6/34
(52) U.S. Cl. ...................................................... 385/37
(58) Field of Search .......................................... 385/37

(56) References Cited

U.S. PATENT DOCUMENTS

| 5,143,531 A | 9/1992 | Kramer |
| 5,177,806 A | 1/1993 | Abbott et al. |
| 5,337,387 A | 8/1994 | Kramer |
| 5,509,952 A | 4/1996 | Moore et al. |
| 5,664,040 A | 9/1997 | Kramer et al. |
| 5,682,453 A | 10/1997 | Daniel et al. |
| 5,694,503 A | 12/1997 | Fleming et al. |
| 5,721,802 A | 2/1998 | Francis et al. |
| 6,349,165 B1 * | 2/2002 | Lock ........................... 385/136 |
| 6,393,181 B1 * | 5/2002 | Bulman et al. ............... 385/37 |
| 6,603,900 B1 * | 8/2003 | Bookbinder et al. .......... 385/37 |

FOREIGN PATENT DOCUMENTS

| AU | 78988/98 | 1/1999 |
| WO | WO 98/27446 | 6/1998 |
| WO | WO 00/28361 | 5/2000 |

OTHER PUBLICATIONS

Derwent Abstract Accession No. 2000–665505/65, Kung, Jun. 23, 2000.

* cited by examiner

Primary Examiner—Rodney Bovemick
Assistant Examiner—Mike Stahl
(74) Attorney, Agent, or Firm—Allen, Dyer, Doppelt, Milbrath & Gilchrist, P.A.

(57) ABSTRACT

A photonic device/a method of forming a photonic device comprising a length of optical fiber loaded in tension over a portion of its length, an in-fiber Bragg grating formed within the tensile loaded portion of the length of fiber, two longitudinally spaced apart supports for the fiber, longitudinally aligned channels in the supports, for receiving the fiber, a carrier in which the supports are located, and glass solder contained within the channel anchors the embedded fiber to the support, the supports being formed from a material that has a coefficient of thermal expansion greater than that of the glass solder.

21 Claims, 3 Drawing Sheets

PHOTONIC DEVICE PACKAGE

FIELD OF THE INVENTION

This invention relates to a photonic device package and, in particular, to a package that comprises an in-fibre Bragg grating and a carrier for the grating.

BACKGROUND OF THE INVENTION

A package of the type with which the present invention is concerned must meet stringent requirements. It must be capable of supporting an optical fibre (that contains the Bragg grating) whilst the optical fibre is strained to a level approaching 100 grams. The strain is imposed for the purpose of tuning the grating to a required centre wavelength, and the strain must be maintained at a substantially constant level for the service life of the grating. This requires that the optical fibre be anchored securely within the carrier, that the anchoring exhibit stability under varying temperature and humidity levels, and that the package exhibit dimensional stability with changes in ambient temperature.

One package that has been developed in an attempt to meet these requirements is disclosed in International patent application number PCT/AU98/00473, dated Jun. 18, 1998. The package comprises a temperature compensating carrier in which an in-fibre grating is anchored by deposits of epoxy resin.

This package has been found to provide long term stability under optimum working conditions, but it does exhibit slight sensitivity to changes in humidity levels, this flowing from inherent characteristics of the epoxy resin. An increasing humidity level causes a downward shift in the centre wavelength of the grating, this making the package unsuitable for use, for example, in high channel count DWDM systems.

Various epoxy compounds have been evaluated in an attempt to resolve the humidity-induced problem, but none has shown any significant benefit over another.

Alternative approaches have been taken, using metal solder to anchor metal-clad optical fibre to supports. However, these approaches have resulted in packages that exhibit significant levels of creep over time.

The present invention has been developed in an attempt to avoid the above described problems and is based on the use of glass solder to provide for stable, humidity insensitive anchoring of optical fibre to supports for the optical fibre.

The selection of glass solder as the anchoring medium has led to the recognition that the supports should have a coefficient of thermal expansion ("CTE") that is higher than that of the glass solder, in order that compression might be induced in the glass solder during post-fusion solidification and simultaneous cooling of both the supports and the glass solder. Furthermore, it has been recognised that portions of the optical fibre that are bonded to the supports by the glass solder should be wholly embedded within the glass solder, and that the glass solder itself should be wholly contained (and hence restrained) within channels in the supports.

Various prior art references disclose the use of glass solder for hermetically sealing, bushing and terminating optical fibres and other photonic devices. In these contexts reference is made to U.S. Pat. Nos. 4,904,046, 5,143,531, 5,177,806, 5,337,387, 5,509,952 and 5,664,040. Also, U.S. Pat. No. 5,682,453 discloses the use of glass solder for bonding together first and second glass-based optical elements.

Perhaps more significantly, U.S. Pat. No. 5,694,503 discloses an in-fibre Bragg grating that is packaged to provide for reflectance that is substantially temperature independent. This package incorporates an Invar support member to which a length of optical fibre is secured by glass solder and epoxy bonding material. However, the support member and associated bonding platforms are formed from a material having a CTE that is equal to or less than that of the glass solder.

SUMMARY OF THE INVENTION

Broadly defined, the present invention provides a photonic device package comprising a length of optical fibre which is loaded in tension over a portion of its length, an in-fibre Bragg grating formed within the tensile loaded portion of the length of the optical fibre, two longitudinally spaced-apart supports for the optical fibre, longitudinally aligned channels in the supports for receiving the optical fibre, a carrier in which the supports are located and through which the length of optical fibre extends, and glass solder anchoring the optical fibre within the channel of each of the supports. The glass solder is wholly contained within the channels of the respective supports, and portions of the optical fibre that are anchored to the supports by the glass solder are wholly embedded within the glass solder. Also, the supports are formed from a material that has a CTE that is greater than that of the glass solder.

Although the package would normally include a single length of optical fibre, two or more lengths of optical fibre might be positioned in parallel within a single carrier. In such case, each optical fibre may extend between and be anchored to an associated pair of longitudinally aligned supports or, in an alternative arrangement, multiple optical fibres may be extended between and be anchored to one pair or supports.

The supports preferably are formed from metal, although they might be formed from a ceramic material. Also, the carrier preferably is fabricated from a metal, most preferably Invar, although, here again, the carrier may be formed at least in part from a ceramic material.

The optical fibre may be pre-tensioned to induce a required level of strain and, thus, be anchored to the supports whilst, at the same time, being loaded in tension. Alternatively, the optical fibre may be post-tensioned by permanently elongating the carrier after the optical fibre has been anchored to the supports or by moving the supports relative to the carrier before fixing the supports to the carrier. As indicated previously, the optical fibre is loaded in tension for the purpose of tuning the grating to a required centre wavelength.

The channel in each of the supports may comprise a tubular channel but it preferably comprises a groove into which the glass solder is deposited to anchor the optical fibre. In this case the groove will have a depth significantly greater than the diameter of the optical fibre in order that the optical fibre might be wholly embedded in the deposit of glass solder and the glass solder deposit might be wholly contained within the groove.

The carrier preferably is formed as a tubular housing in which the supports are located and through which the optical fibre extends. The carrier may be fabricated from a metal or a ceramic material. In the preferred form of the invention the housing will be formed within its wall with at least one opening adjacent each of the supports, to permit deposition of the glass solder into the grooves in the respective supports. Two diametrically opposed such openings preferably are provided adjacent each of the supports, one for accommodating deposition of the glass solder and the other to facilitate the application of fusing heat to the glass solder by way of the support. The glass solder may be in the form of a slurry or sintered preform. A sintered preform is understood to be a unit of bonded glass powder, and has the advantage of allowing a measured dose of glass solder to be deposited in the channels.

The glass solder preferably is composed predominantly of lead oxide ($PbO_2$), together with boron oxide ($B_2O_3$) and non-abrading glass fillers. Suitable fillers are titanium dioxide ($TiO_2$), silica ($SiO_2$) and zirconia ($ZrO_2$). The constituents of the glass solder should be selected to avoid surface abrasion of the optical fibre within the deposits of the glass solder and, thus, the constituents should ideally have a smooth, spherical form.

The invention may also be defined as a method of assembling a photonic device package comprising a length of optical fibre which is loaded in tension over a portion of its length, an in-fibre Bragg grating formed within the tensile loaded portion of the length of the optical fibre, two longitudinally spaced-apart supports for the optical fibre, longitudinally aligned channels in the supports for receiving the optical fibre, a carrier in which the supports are located and through which the length of optical fibre extends, and glass solder anchoring the optical fibre within the channel of each of the supports; the supports being formed from a material that has a coefficient of thermal expansion that is greater than that of the glass solder, the glass solder being wholly contained within the channels of the respective supports and portions of the optical fibre that are anchored to the supports by the glass solder being wholly embedded within the glass solder, the method comprising:

longitudinally tensioning the optical fibre such that the in-fibre grating is tuned to a required centre wavelength;

using glass solder to anchor the optical fibre to the supports.

The invention will be more fully understood from the following description of a preferred embodiment of a photonic device package. The description is provided with reference to the accompanying drawings.

DETAILED DESCRIPTION OF THE INVENTION

As illustrated, the photonics device package comprises two longitudinally spaced-apart supports 10 for a length of optical fibre 11. The supports 10 are located within opposite ends of a carrier 12 through which the optical fibre 11 extends, and the carrier 12 is located within a protective sleeve 13.

Figure 1:
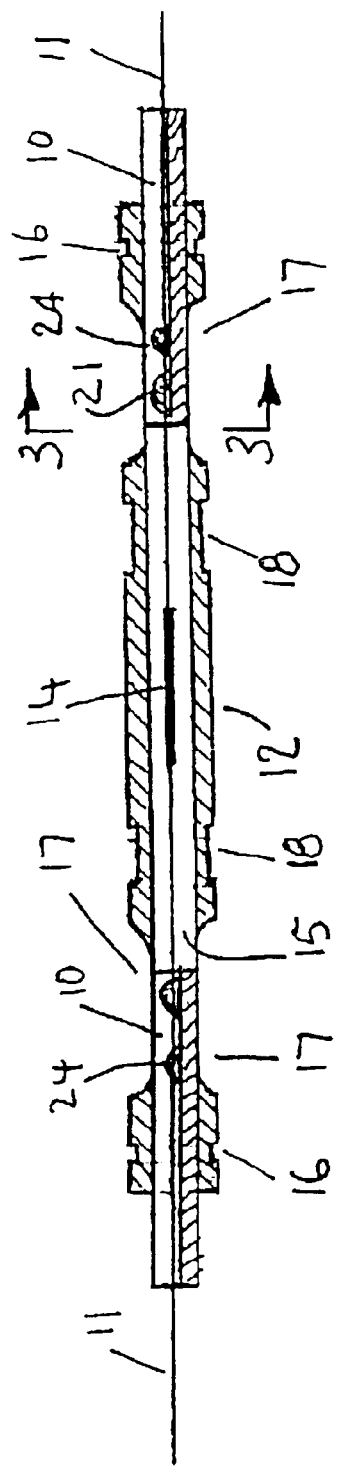
FIG. 1 shows on an enlarged scale a sectional elevation view of assembled carrier and fibre support components of the package.
Figure 2:
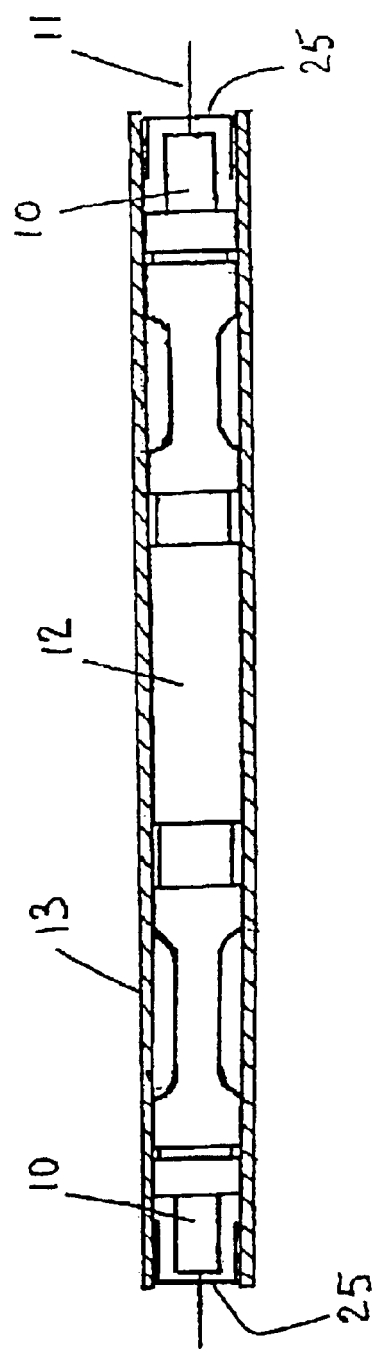
FIG. 2 shows a sectional elevation view of the assembly of FIG. 1 mounted within a protective sleeve.

The optical fibre 11 is formed within a portion of its length with a Bragg grating that is indicated schematically in FIG. 1 by the exaggerated fibre thickness 14, and the grating-containing portion of the optical fibre that extends between the supports 10 is loaded in tension to an extent required to impose a requisite degree of strain in the grating-containing region of the fibre. The level of strain that is imposed will be dependent upon that required to tune the grating to a selected centre wavelength.

The carrier 12 is formed from a rod of low expansion material such as Invar and it is provided with a central bore 15 through which the optical fibre 11 extends. The supports 10 are located within the bore 15 and are held in place by welding through the carrier 12 at end regions 16.

Two diametrically opposed elongated openings 17 are provided adjacent each end of the carrier for reasons to be described later in this specification, and two longitudinally spaced, circumferential grooves 18 are provided to facilitate gripping of the carrier. The reason for the grooves 18 will also be explained later in this specification.

Figure 3:
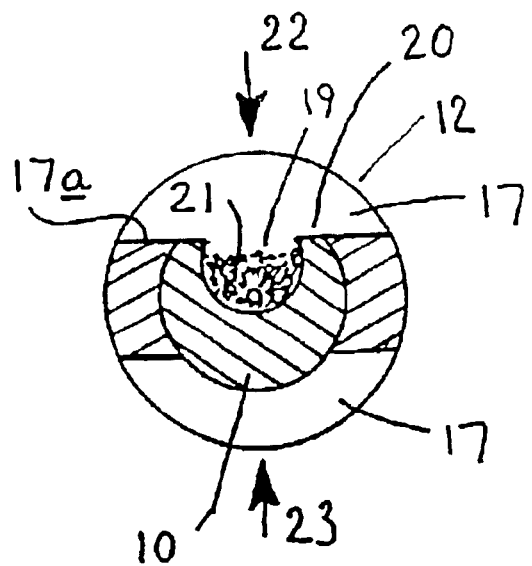
FIG. 3 shows (further enlarged) a cross-sectional view of the assembly as seen in the direction of section plane 3—3 in FIG. 1.
Figure 4:
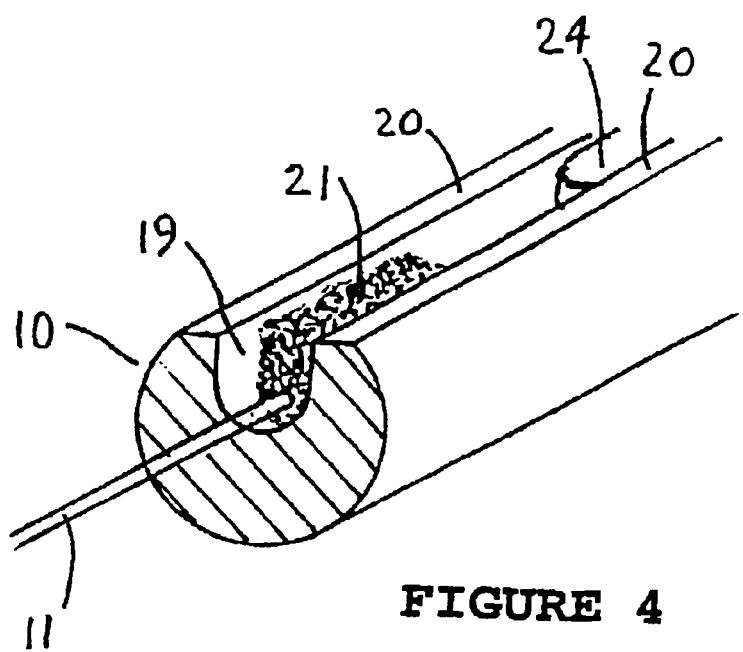
FIG. 4 shows (still further enlarged) a perspective view of a portion of one of the supports when removed from the package.

As is most clearly shown in FIGS. 3 and 4, each of the supports 10 comprises a generally cylindrical element that is formed along its full length with a longitudinally extending groove 19. Also, the supports 10 are formed with flat lips 20 at each side of the groove, to coincide with side lands 17a of the upper openings 17.

The supports 10 can be formed from stainless steel, aluminium, or other any other material with a suitable CTE to ensure the glass solder is in compression.

The groove 19 within each support 10 has a depth which is approximately equal to the radial dimension of the support. The optical fibre 11 is nested in the groove 19 in each of the supports 10 and is anchored in place by a deposit 21 of glass solder. There are two methods of attaching the optical fibre to the supports.

In the first method, the glass solder 21 is deposited in each of the grooves 19 after the optical fibre has been extended through the carrier 12, and the glass solder is subjected to localised heat. The glass solder is deposited within each of the grooves 19 by way of the upper openings 17 and, thus, in the direction of arrow 22. The fusing heat for the glass solder is applied by focussing a $CO_2$ laser beam in the direction of arrow 23 through the openings 17 and against the underside of each of the supports 10. Thus, the glass solder is fused by heat applied by way of the supports, this providing for good wetting of the solder-to-supports and minimising the risk of damage to the optical fibre. Of course, the normal acrylate (plastics material) cladding is removed from the portions of the length of the optical fibre that are to be embedded within the solder glass deposits, in order to provide for solder-to-glass contact.

In the second method, the glass solder 21 is deposited in the grooves and the fusing heat is applied to melt the solder. The package is then raised so that the suspended optical fibre 11 is immersed in the glass solder within the grooves 19. Alternatively, the optical fibre 11 can be lowered into the glass solder within the grooves 19 when the glass solder is molten. Once the fibre has wetted to the solder, the heat is reduced to allow the solder to solidify, thus bonding the fibre to the supports 10.

A glass solder that is suitable for anchoring the optical fibre to the supports has the following (weight percentage) composition:

$PbO_2 > 70$ $B_2O_3 > 5$ $SiO_2 > 1$

ZrO$_2$>1

TiO$_2$>10

The glass solder composition has a fusing temperature below 550° C.

During the period when the glass solder frit is fusing and subsequently solidifying, the optical fibre is held under light tension, just sufficient to hold the fibre slightly above the base of the grooves 19 and to permit the free flow of molten glass solder around the optical fibre.

In order to protect the packaged fibre from any external load that might be applied to the optical fibre, a plastics material clad portion of the optical fibre is anchored within the groove 19 of each of the supports 10 by a deposit 24 of acrylate resin. The resin deposit is cured by exposure to UV radiation.

Following anchoring of the optical fibre 11 within the grooves 19 in the supports 10 and fixing the supports to the carrier, the assembly as illustrated in FIG. 1 is gripped by way of the grooves 18 and is subjected to an elongating tensile load. The carrier 12 and the grating-containing portion of the optical fibre are thereby elongated to an extent sufficient to induce a required level of strain into the grating-containing portion of the optical fibre. Alternatively the supports may be moved relative to the carrier to adjust the tension on the grating before fixing the supports to the carrier. The required level of strain to be induced in the optical fibre is detected by launching an optical signal into the fibre and detecting for peak reflectance of the grating at the required centre wavelength.

Having tuned the grating, the assembly as shown in FIG. 1 is inserted into the sleeve 13 and is enclosed by ends caps 25 that are press-fitted to end regions of the sleeve 13.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

What is claimed is:

1. A photonic device package comprising
  a length of optical fiber which is loaded in tension over a portion of its length,
  an in-fiber Bragg grating formed within the tensile loaded portion of the length of the optical fiber,
  two longitudinally spaced-apart supports for the optical fiber,
  longitudinally aligned channels in the supports for receiving the optical fiber,
  a metal carrier in which the supports are located and through which the length of optical fiber extends, and
  glass solder anchoring the optical fiber within the channel of each of the supports;
  the supports being formed from a material that has a coefficient of thermal expansion that is greater than that of the glass solder,
  the glass solder being wholly contained within the channels of the respective supports, and
  portions of the optical fiber that are anchored to the supports by the glass solder being wholly embedded within the glass solder.

2. The photonic device package according to claim 1 wherein the supports are formed from metal.

3. The photonic device package according to claim 1 wherein the supports are formed from a ceramic material.

4. The photonic device package according to claim 1, wherein the metal comprises Invar.

5. The photonic device package according to claim 1 wherein the optical fiber is longitudinally pre-tensioned before being anchored to the supports in order to tune the grating to a required center wavelength.

6. The photonic device package according to claim 1 wherein the channel in each of the supports comprises a groove into which the glass solder is deposited to anchor the optical fiber.

7. The photonic device package according to claim 1 wherein each channel has a depth greater than the diameter of the optical fiber so as to allow the optical fiber to be wholly embedded in the glass solder and to allow the glass solder to be wholly contained within the channel.

8. The photonic device package according to claim 1 wherein the carrier is formed as a tubular housing in which the supports are located and through which the optical fiber extends.

9. The photonic device package according to claim 8 wherein the housing is formed with at least one opening adjacent each of the supports to enable deposition of the glass solder into in the channels in the respective supports.

10. A photonic device package comprising
  a length of optical fiber which is loaded in tension over a portion of its length,
  an in-fiber Bragg grating formed within the tensile loaded portion of the length of the optical fiber,
  two longitudinally spaced-apart supports for the optical fiber,
  longitudinally aligned channels in the supports for receiving the optical fiber,
  a carrier in which the supports are located and through which the length of optical fiber extends, and
  glass solder anchoring the optical fiber within the channel of each of the supports;
  wherein the supports are formed from a material that has a coefficient of thermal expansion that is greater than that of the glass solder,
  wherein the glass solder is wholly contained within the channels of the respective supports;
  wherein portions of the optical fiber that are anchored to the supports by the glass solder are wholly embedded within the glass solder; and
  wherein the optical fiber is longitudinally post-tensioned after being anchored to the supports in order to tune the grating to a required center wavelength.

11. The photonic device package according to claim 10, wherein the carrier is fabricated from a metal.

12. The photonic device package according to claim 10, wherein the carrier is fabricated from a ceramic.

13. A photonic device package comprising
  a length of optical fiber which is loaded in tension over a portion of its length,
  an in-fiber Bragg grating formed within the tensile loaded portion of the length of the optical fiber,
  two longitudinally spaced-apart supports for the optical fiber,
  longitudinally aligned channels in the supports for receiving the optical fiber,
  a carrier in which the supports are located and through which the length of optical fiber extends, and
  glass solder anchoring the optical fiber within the channel of each of the supports;

wherein the supports are formed from a material that has a coefficient of thermal expansion that is greater than that of the glass solder, wherein the glass solder is wholly contained within the channels of the respective supports;

wherein portions of the optical fiber that are anchored to the supports by the glass solder are wholly embedded within the glass solder; and wherein the glass solder is composed predominantly of lead oxide ($PbO_2$), together with boron oxide ($B_2O_3$) and non-abrading glass fillers.

14. The photonic device package according to claim 13 wherein the glass fillers comprise one or more of the following compounds:

titanium dioxide;

silica; and zirconia.

15. A method of assembling a photonic device package comprising a length of optical fiber which is loaded in tension over a portion of its length, an in-fiber Bragg grating formed within the tensile loaded portion of the length of the optical fiber, two longitudinally spaced-apart supports for the optical fiber, longitudinally aligned channels in the supports for receiving the optical fiber, a carrier in which the supports are located and through which the length of optical fiber extends, and glass solder anchoring the optical fiber within the channel of each of the supports; the supports being formed from a material that has a coefficient of thermal expansion that is greater than that of the glass solder, the glass solder being wholly contained within the channels of the respective supports and portions of the optical fiber that are anchored to the supports by the glass solder being wholly embedded within the glass solder, the method comprising:

longitudinally tensioning the optical fiber such that the in-fiber grating is tuned to a required center wavelength;

using glass solder to anchor the optical fiber to the supports;

wherein the step of longitudinally tensioning the optical fiber is carried out after the fiber is anchored to the supports.

16. The method according to claim 15 wherein the step of longitudinally tensioning the optical fiber is also carried out before the fiber is anchored to the supports.

17. The method according to any one claim 15 wherein the glass solder is deposited in the channels in the form of a slurry.

18. The method according to claim 15 wherein the step of anchoring the fiber to the supports comprises:

inserting the fiber into the channels of the supports;

depositing glass solder in the channels around the fiber;

melting the glass solder.

19. A method of assembling a photonic device package comprising a length of optical fiber which is loaded in tension over a portion of its length, an in-fiber Bragg grating formed within the tensile loaded portion of the length of the optical fiber, two longitudinally spaced-apart supports for the optical fiber, longitudinally aligned channels in the supports for receiving the optical fiber, a carrier in which the supports are located and through which the length of optical fiber extends, and glass solder anchoring the optical fiber within the channel of each of the supports; the supports being formed from a material that has a coefficient of thermal expansion that is greater than that of the glass solder, the glass solder being wholly contained within the channels of the respective supports and portions of the optical fiber that are anchored to the supports by the glass solder being wholly embedded within the glass solder, the method comprising:

longitudinally tensioning the optical fiber such that the in-fiber grating is tuned to a required center wavelength; using glass solder to anchor the optical fiber to the supports;

wherein the glass solder is deposited in the channels in the form of a sintered preform.

20. A method of assembling a photonic device package comprising a length of optical fiber which is loaded in tension over a portion of its length, an in-fiber Bragg grating formed within the tensile loaded portion of the length of the optical fiber, two longitudinally spaced-apart supports for the optical fiber, longitudinally aligned channels in the supports for receiving the optical fiber, a carrier in which the supports are located and through which the length of optical fiber extends, and glass solder anchoring the optical fiber within the channel of each of the supports; the supports being formed from a material that has a coefficient of thermal expansion that is greater than that of the glass solder, the glass solder being wholly contained within the channels of the respective supports and portions of the optical fiber that are anchored to the supports by the glass solder being wholly embedded within the glass solder, the method comprising:

longitudinally tensioning the optical fiber such that the in-fiber grating is tuned to a required center wavelength; using glass solder to anchor the optical fiber to the supports;

wherein the step of anchoring the fiber to the supports comprises:

depositing the glass solder in the channels;

melting the glass solder; and immersing the fiber in the melted glass solder.

21. The method according to claim 20, wherein the step of longitudinally tensioning the optical fiber is carried out after the fiber is anchored to the supports.

* * * * *